US008027943B2

(12) United States Patent
Juan et al.

(10) Patent No.: US 8,027,943 B2
(45) Date of Patent: Sep. 27, 2011

(54) SYSTEMS AND METHODS FOR OBSERVING RESPONSES TO INVITATIONS BY USERS IN A WEB-BASED SOCIAL NETWORK

(75) Inventors: Yun-Fang Juan, San Jose, CA (US);
Kang-Xing Jin, Palo Alto, CA (US)

(73) Assignee: Facebook, Inc., Palo Alto, CA (US)

( * ) Notice: Subject to any disclaimer, the term of this patent is extended or adjusted under 35 U.S.C. 154(b) by 948 days.

(21) Appl. No.: 11/893,820

(22) Filed: Aug. 16, 2007

(65) Prior Publication Data
US 2009/0049036 A1 Feb. 19, 2009

(51) Int. Cl.
*G06F 17/30* (2006.01)
(52) U.S. Cl. .......................................... 706/45; 705/319
(58) Field of Classification Search .................... 706/45; 707/4, 6; 705/26, 319; 709/218
See application file for complete search history.

(56) References Cited

U.S. PATENT DOCUMENTS

| 5,937,413 | A | 8/1999 | Hyun |
| 6,029,141 | A | 2/2000 | Bezos |
| 7,013,292 | B1 | 3/2006 | Hsu |
| 7,069,308 | B2 * | 6/2006 | Abrams ...................... 709/218 |
| 7,249,123 | B2 | 7/2007 | Elder |
| 7,269,590 | B2 | 9/2007 | Hull |
| 2001/0037721 | A1 | 11/2001 | Hasegawa |
| 2002/0059201 | A1 | 5/2002 | Work |
| 2002/0107853 | A1 * | 8/2002 | Hofmann et al. ................. 707/7 |
| 2003/0145093 | A1 | 7/2003 | Oren |
| 2003/0222918 | A1 | 12/2003 | Coulthard |
| 2003/0225632 | A1 | 12/2003 | Tong |
| 2004/0024846 | A1 | 2/2004 | Randall |
| 2004/0088177 | A1 | 5/2004 | Travis |
| 2004/0122686 | A1 | 6/2004 | Hill et al. |
| 2004/0148275 | A1 | 7/2004 | Achlioptas |
| 2005/0021750 | A1 | 1/2005 | Abrams |
| 2005/0114130 | A1 * | 5/2005 | Java et al. ..................... 704/240 |
| 2005/0114759 | A1 | 5/2005 | Williams |
| 2005/0154639 | A1 | 7/2005 | Zetmeir |
| 2005/0159970 | A1 | 7/2005 | Buyukkokten |

(Continued)

OTHER PUBLICATIONS

Hofmann, T. 'Collaborative Filtering via Gaussian Probabilistic Latent Semantic Analysis', SIGIR '03, Proceedings of 26th annual International ACM SIGIR conference on Research and development in information retrieval, Jul. 28-Aug. 1, 2003, pp. 259-266 [online]. Association of Computer Machinery [retrieved on Nov. 15, 2010]doi>10.1145/860435.860483.*

(Continued)

*Primary Examiner* — Jeffrey A Gaffin
*Assistant Examiner* — Ola Olude-Afolabi
(74) *Attorney, Agent, or Firm* — Fenwick & West LLP

(57) ABSTRACT

A system and method for selecting a subset of keywords from a set of master keywords found in user profiles in a social network is disclosed. The method includes selecting a first and second group of user profiles including one or more keywords and computing the number of occurrences of each of the master keywords in the first and second group of profiles. A value may be computed for each of the master keywords based on a comparison of the number of occurrences in the first group of profiles and the number of occurrences in the second group of profiles. The computed value may be used for selecting the subset of keywords from the master keywords and/or ranking the master keywords.

25 Claims, 3 Drawing Sheets

U.S. PATENT DOCUMENTS

| | | |
|---|---|---|
| 2005/0171799 A1 | 8/2005 | Hull |
| 2005/0171955 A1 | 8/2005 | Hull |
| 2005/0177385 A1 | 8/2005 | Hull |
| 2005/0197846 A1 | 9/2005 | Pezaris |
| 2005/0198020 A1 | 9/2005 | Garland |
| 2005/0198031 A1 | 9/2005 | Pezaris |
| 2005/0198305 A1 | 9/2005 | Pezaris |
| 2005/0203807 A1 | 9/2005 | Bezos |
| 2005/0216300 A1 | 9/2005 | Appelman |
| 2005/0216550 A1 | 9/2005 | Paseman |
| 2005/0235062 A1 | 10/2005 | Lunt |
| 2005/0256756 A1 | 11/2005 | Lam |
| 2006/0026147 A1 | 2/2006 | Cone et al. |
| 2006/0041543 A1 | 2/2006 | Achlioptas |
| 2006/0042483 A1 | 3/2006 | Work |
| 2006/0048059 A1 | 3/2006 | Etkin |
| 2006/0052091 A1 | 3/2006 | Onyon |
| 2006/0080613 A1 | 4/2006 | Savant |
| 2006/0085419 A1 | 4/2006 | Rosen |
| 2006/0106847 A1 | 5/2006 | Eckardt et al. |
| 2006/0136419 A1 | 6/2006 | Brydon |
| 2006/0143183 A1 | 6/2006 | Goldberg |
| 2006/0161599 A1 | 7/2006 | Rosen |
| 2006/0184617 A1 | 8/2006 | Nicholas |
| 2006/0190281 A1 | 8/2006 | Kott |
| 2006/0194186 A1 | 8/2006 | Nanda |
| 2006/0218225 A1 | 9/2006 | Hee Voon |
| 2006/0229063 A1 | 10/2006 | Koch |
| 2006/0230061 A1 | 10/2006 | Sample |
| 2006/0247940 A1 | 11/2006 | Zhu |
| 2006/0248573 A1 | 11/2006 | Pannu |
| 2006/0256008 A1 | 11/2006 | Rosenberg |
| 2006/0265227 A1 | 11/2006 | Sadamura |
| 2006/0293976 A1 | 12/2006 | Nam |
| 2007/0174389 A1 | 7/2007 | Armstrong |
| 2007/0208916 A1 | 9/2007 | Tomita |
| 2007/0282987 A1 | 12/2007 | Fischer |
| 2008/0005076 A1 | 1/2008 | Payne |
| 2008/0010343 A1 | 1/2008 | Escaffi |
| 2008/0033776 A1 | 2/2008 | Marchese |
| 2008/0040428 A1 | 2/2008 | Wei |
| 2008/0070697 A1 | 3/2008 | Robinson |
| 2008/0086458 A1 | 4/2008 | Robinson |

OTHER PUBLICATIONS

PCT International Search Report and Written Opinion, PCT/US2008/008221, Oct. 1, 2008, 8 Pages.

U.S. Appl. No. 11/639,655, filed Dec. 14, 2006, Mark Zuckerberg, Systems and Methods for Social Mapping.

U.S. Appl. No. 11/646,206, filed Dec. 26, 2006, Aaron Sittig, Systems and Methods for Generating a Social Timeline.

U.S. Appl. No. 11/493,291, filed Jul. 25, 2006, Mark Zuckerberg, Systems and Methods for Dynamically Generating a Privacy Summary.

U.S. Appl. No. 11/701,698, filed Feb. 2, 2007, Jed Stremel, System and Method for Digital File Distribution.

U.S. Appl. No. 11/713,455, filed Feb. 28, 2007, Jed Stremel, Systems and Methods for Automatically Locating Web-Based Social Network Members.

U.S. Appl. No. 11/701,566, filed Feb. 2, 2007, Jed Stremel, System and Method for Automatic Population of a Contact File with Contact Content and Expression Content.

U.S. Appl. No. 11/502,757, filed Aug. 11, 2006, Andrew Bosworth, Systems and Methods for Generating Dynamic Relationship-Based Content Personalized for Members of a Web-Based Social Network.

U.S. Appl. No. 11/503,093, filed Aug. 11, 2006, Andrew Bosworth, Systems and Methods for Measuring User Affinity in a Social Network Environment.

U.S. Appl. No. 11/503,037, filed Aug. 11, 2006, Mark Zuckerberg, Systems and Methods for Providing Dynamically Selected Media Content to a User of an Electronic Device in a Social Network Environment.

U.S. Appl. No. 11/503,242, filed Aug. 11, 2006, Mark Zuckerberg, System and Method for Dynamically Providing a News Feed About a User of a Social Network.

U.S. Appl. No. 11/499,093, filed Aug. 2, 2006, Mark Zuckerberg, Systems and Methods for Dynamically Generating Segmented Community Flyers.

U.S. Appl. No. 11/580,210, filed Oct. 11, 2006, Mark Zuckerberg, System and Method for Tagging Digital Media.

U.S. Appl. No. 11/893,493, filed Aug. 15, 2007, Arieh Steinberg, Web-Based Social Network Badges.

U.S. Appl. No. 11/982,974, filed Nov. 5, 2007, Ruchi Sanghvi, Systems and Methods for a Web-Based Social Networking Environment Integrated Within One or More Computing and/or Networking Applications.

U.S. Appl. No. 11/701,595, filed Feb. 2, 2007, Ezra Callahan, System and Method for Determining a Trust Level in a Social Network Environment.

U.S. Appl. No. 11/726,962, filed Mar. 23, 2007, Charlie Cheever, System and Method for Confirming an Association in a Web-Based Social Network.

U.S. Appl. No. 11/701,744, filed Feb. 2, 2007, Andrew Bosworth, System and Method for Curtailing Objectionable Behavior in a Web-Based Social Network.

U.S. Appl. No. 11/796,184, filed Apr. 27, 2007, Jared S. Morgenstern, System and Method for Giving Gifts and Displaying Assets in a Social Network Environment.

U.S. Appl. No. 11/893,797, filed Aug. 16, 2007, Yun-Fang Juan, System and Method for Invitation Targeting in a Web-Based Social Network.

U.S. Appl. No. 11/899,426, filed Sep. 5, 2007, Jared Morgenstern, System and Method for Collectively Giving Gifts in a Social Network Environment.

U.S. Appl. No. 12/072 003, filed Feb. 21, 2008, Arieh Steinberg, Systems and Methods for Implementation of a Structured Query Language Interface in a Distributed Database Environment.

U.S. Appl. No. 12/077,070, filed Mar. 13, 2008, Dave Fetterman, Systems and Methods for Network Authentication.

U.S. Appl. No. 12/154,504, filed May 23, 2008, Adam D'Angelo, Personalized Platform for Accessing Internet Applications.

U.S. Appl. No. 12/156,091, filed May 28, 2008, Mark Zuckerberg, Systems and Methods for Auction Based Polling.

U.S. Appl. No. 12/151,734, filed May 7, 2008, Jared Morgenstern, Systems and Methods for Classified Advertising in an Authenticated Web-Based Social Network.

U.S. Appl. No. 12/154 886, filed May 27, 2008, Nico Vera, Systems and Methods for Providing Privacy Settings for Applications Associated with a User Profile.

U.S. Appl. No. 60/965,624, filed Aug. 20, 2007, Adam D'Angelo, Systems and Methods for Targeting Advertisements in a Social Network Environment.

U.S. Appl. No. 11/893,559, filed Aug. 15, 2007, Adam D'Angelo, Platform for Providing a Social Context to Software Applications.

U.S. Appl. No. 60/967,842, filed Sep. 7, 2007, Ezra Callahan, Systems and Methods for Dynamically Updating Privacy Settings.

U.S. Appl. No. 60/966,442, filed Aug. 28, 2007, Ezra Callahan, System and Method for Incorporating an Entity or Group other than a Natural Person into a Social Network.

U.S. Appl. No. 60/965,852, filed Aug. 22, 2007, Adam D'Angelo, Systems and Methods for Advertising.

U.S. Appl. No. 61/005,614, filed Dec. 5, 2007, Yishan Wong, Systems and Methods for Community Translations on a Web-Based Social Network.

U.S. Appl. No. 12/080,808, filed Apr. 2, 2008, Peter Deng, Systems and Methods for Calendaring.

Flores, Fernando et al. "Computer systems and the design of organizational interaction." In ACM Transactions on Information Systems (TOIS), vol. 6, Issue 2, Apr. 1988.

Chipin. Chipln: The easy way to collect money [online], Dec. 15, 2006 http://web.archive.org/web/20061215090739/www.chipin.com/overview.

Parzek, E. Social Networking to Chipln to a Good Cause [online]. Business Design Studio, Jun. 29, 2006 http://www.businessdesignstudio.com/resources/blogger/2006/06social-networking-tochipin-to-good.html.

* cited by examiner

SYSTEMS AND METHODS FOR OBSERVING RESPONSES TO INVITATIONS BY USERS IN A WEB-BASED SOCIAL NETWORK

CROSS-REFERENCE TO RELATED APPLICATIONS

The present application incorporates by reference:

U.S. patent application Ser. No. 11/639,655 filed on Dec. 14, 2006, entitled "Systems and Methods for Social Mapping," which in turn claims the benefit and priority of U.S. Provisional Patent Application Ser. No. 60/750,844 filed on Dec. 14, 2005, entitled "Systems and Methods for Social Mapping,"

U.S. Pat. No. 7,797,256, application Ser. No. 11/499,093 filed on Aug. 2, 2006, entitled "Systems and Methods for Dynamically Generating Segmented Community Flyers,"

U.S. Pat. No. 7,669,123, application Ser. No. 11/503,242 filed on Aug. 11, 2006, entitled "System and Method for Dynamically Providing a News Feed About a User of a Social Network,"

U.S. patent application Ser. No. 11/580,210 filed on Oct. 11, 2006, entitled "System and Method for Tagging Digital Media,"

U.S. patent application Ser. No. 11/796,184 filed on Apr. 27, 2007, entitled "Systems and Methods for Giving Gifts and Displaying Assets in a Social Network Environment," which in turn claims the benefit and priority of U.S. Provisional Patent Application Ser. No. 60/899,121 filed on Feb. 2, 2007, entitled "Systems and Methods for Automatically Giving Gifts and Displaying Assets in a Social Network Environment,"

U.S. patent application Ser. No. 11/893,797 filed on Aug. 16, 2007, entitled "System and Method for Invitation Targeting in a Web-Based Social Network."

BACKGROUND

1. Field of the Invention

The present invention relates generally to social networks, and more particularly to invitations in a social network.

2. Description of Related Art

Social network environments present many types of invitations to users. Examples of an invitation include an advertisement, a request to join a group, a request for an information exchange, a survey, a request to write a blog entry, a request to verify a photo tag, and so forth.

It is often useful to be able to characterize major differences between two sets of users in a social network. A probability function may be useful for predicting the likelihood of a positive or negative response by a user to an invitation. In a co-pending application, the probability function may be determined from user information including keywords in selected user profiles and from the users' responses to a prior invitation. See co-pending U.S. patent application Ser. No. 11/893,797 filed on Aug. 16, 2007, entitled "System and Method for Invitation Targeting in a Web-Based Social Network." However, those techniques do not allow for a determination of characteristics of the users who respond and/or do not respond to the invitation (e.g., what distinguishes the users who respond from the users who do not respond, how do the users who responded differ demographically from users in general and from users who do not respond, etc.). For example, the number of users who respond may not be sufficient to provide useful information or make statistically significant inferences. The raw information about the keywords used in determining the probability function may be insufficient to provide useful details about a correlation between user information and the users. Moreover, data manipulation used in determining the probability function may reduce the user information including the keywords to a format that is not easily interpreted and make it difficult to extract insights directly from the keywords or the probability function results.

SUMMARY

In one embodiment, the present invention provides a method of using responses to an invitation for selecting keywords that are useful in determining characteristics of a user. The method includes selecting two groups of users and calculating a histogram of the keywords for each group. The histograms are compared and the keywords ranked from high to low based on the comparison. A predetermined number of the highest ranked keywords may be selected. Various criteria may be used for selecting either of the two groups. For example, the two groups may be selected from users who respond to an invitation and users who do not respond to the invitation, respectively. Alternatively, the two groups may be selected from users who are likely to respond to the invitation and a random selection of users, respectively. In some embodiments, the comparison of the histograms for the two groups may be based on an arithmetic difference between corresponding entries in the two groups for each keyword. Alternatively, the comparison may be based on a ratio difference, an information gain, an odds ratio, a relevancy score, and so forth.

In another embodiment, the invention provides a method for selecting a subset of keywords from a set of master keywords in user profiles of social network users. The method comprises computing a first histogram of each keyword in the set of master keywords based on the occurrence of the keywords in a first group of user profiles, computing a second histogram of each keyword in the set of master keywords based on the occurrence of the keywords in a second group of user profiles, computing a score based on a comparison of the first histogram and the second histogram for each keyword in the set of master keywords, ranking the master keywords based on the scores of the keywords, and selecting a subset of keywords from the master keywords based on the ranking.

DETAILED DESCRIPTION

The present invention provides a method for keyword selection in a web-based social network. In one embodiment, a first group and second group of users are selected. The number of occurrences of each keyword in the profiles of the users in the first group may be calculated to produce a first histogram. Likewise, a second histogram may be calculated for the second group. The first histogram may be compared to the second histogram by calculating a score for each keyword based on a difference between the number of occurrences of the keyword in the first group and the number of occurrences of the same keyword in the second group. The keywords may be ranked according to the difference calculated for each keyword, and a set of the highest ranked keywords selected. Alternatively, the comparison of the first histogram to the second histogram may be based on functions other than a difference.

Figure 1:
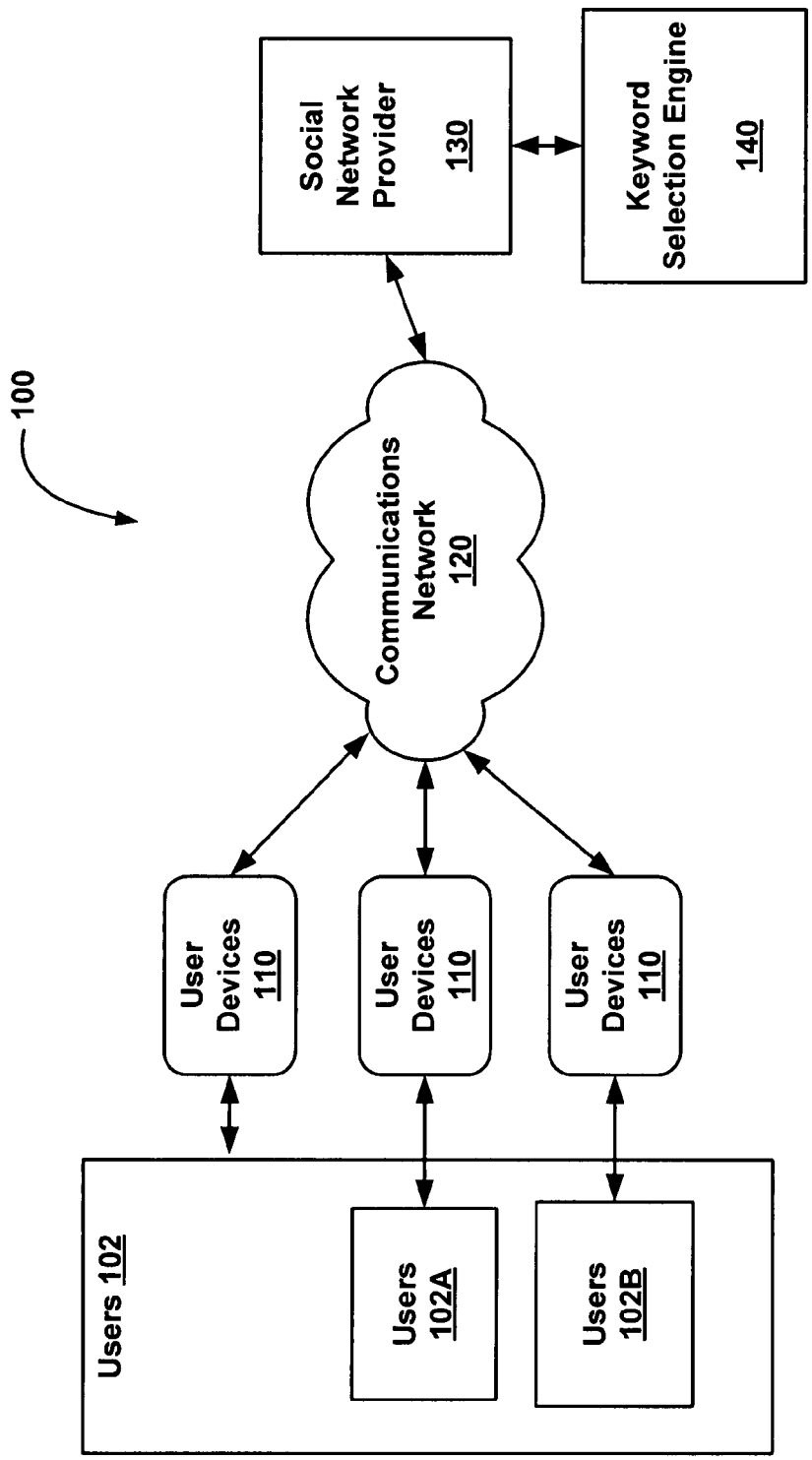
FIG. 1 illustrates an exemplary web based social network environment that may be used with various embodiments of the invention.

FIG. 1 illustrates an exemplary web based social network environment 100 that may be used with various embodiments of the invention. One or more users 102 at user devices 110 are coupled to a social network provider 130 via a communications network 120. The users 102 may include various types of users, including a first group of users 102A who are selected to be members of the first group and a second group of users 102B who are selected to be members of a second group. In various embodiments, user devices 110 may include a computer terminal, a personal digital assistant (PDA), a wireless telephone, a digital camera, a mobile device, a mobile phone, a cell-phone, a smart-phone, a notebook computer, a laptop computer, a hand-held game console, and so forth. In various embodiments, the communications network 120 may include a local area network (LAN) such as an intranet, a wide area network (WAN) such as the Internet, a wireless network, etc.

The social network provider 130 is an entity or person that provides social networking services, communication services, dating services, company intranets, and/or online games, etc. The social network provider 130 may assemble and store profiles of the users 102 for use in providing the social networking services. In some embodiments, the social network environment 100 includes a segmented community, such as a separate, exclusive or semi-exclusive subset of the social network environment 100, wherein users 102 who are segmented community members may access and interact with other members of their respective segmented community. The social network environment 100 further includes a keyword extraction engine 140 coupled to the social network provider 130.

Figure 2:
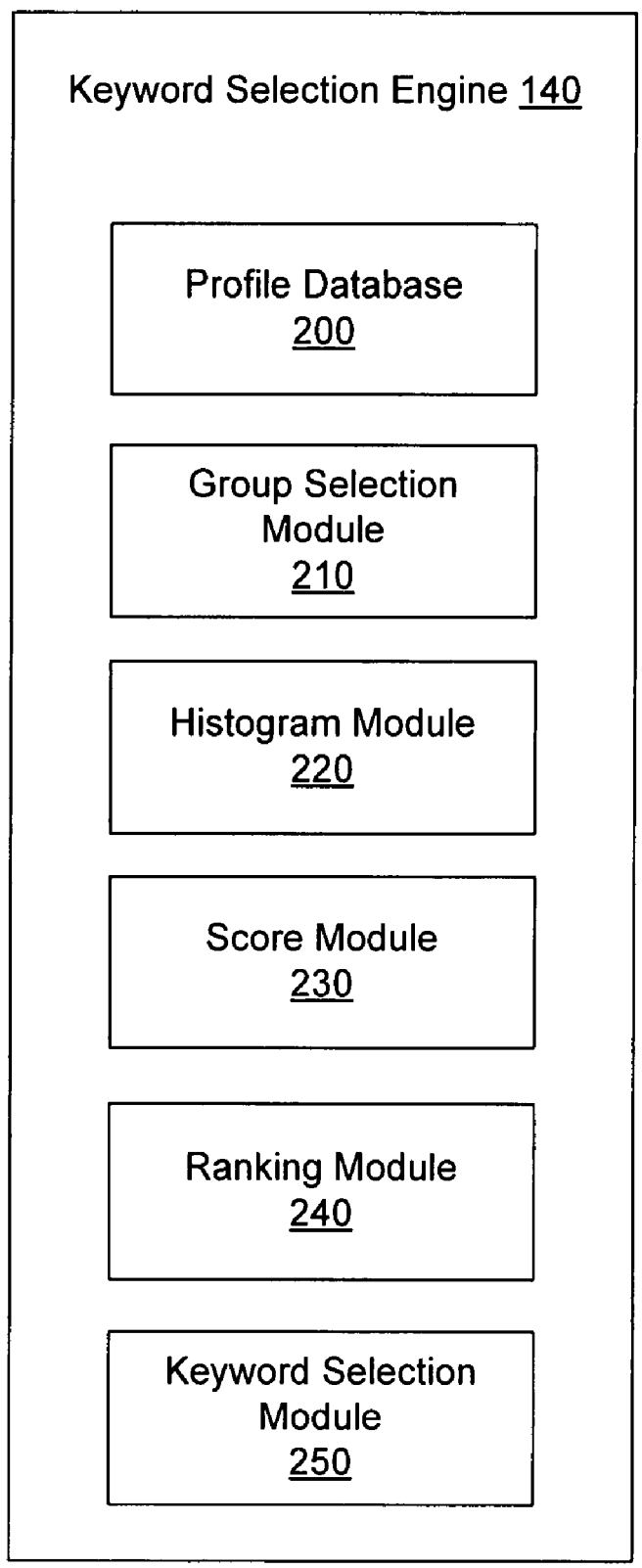
FIG. 2 illustrates one embodiment of the architecture of the keyword extraction engine of FIG. 1.

FIG. 2 illustrates one embodiment of the architecture of the keyword extraction engine 140 of FIG. 1. The keyword extraction engine 140 is configured to select keywords that are useful in characterizing the users 102. The keyword extraction engine 140 includes a profile database 200, a group selection module 210, a histogram module 220, a score module 230, an optional ranking module 240, and a keyword selection module 250.

The profile database 200 manages profile information that is provided by users 102 of the social network. The profile information may contain keywords. Keywords may be words or phrases relating to information about the users 102. Keywords include words relating to demographics, interests, usage, actions, or other information that may describe each of the users 102. Keywords may be entered by the user, may be entered about the user 102, or may be inferred from other information about the user 102. A user profile may include multiple occurrences of one or more keywords. The profile information for the users 102 may be found in more than one database available to the social network provider, 130, for example, the social network provider 130 and/or the keyword extraction engine 140.

The profile database 200 may store values including numerical values, binary values, and/or categorical values to represent various types of keywords. A numerical value may represent an age, a phone number, or other data normally expressed in numbers. A binary number may represent occurrence or non-occurrence of a keyword in the profile of a user 102. For example, if the keyword is football, a "1" means that the keyword "football" occurs at least once in the profile of the user 102 and a "0" means that "football" does not occur in the profile of the user 102. In some embodiments, a "1" may mean that a keyword (e.g., "football") occurs more than a predetermined number of times. A categorical value may represent a selection from a list. For example, political views may be categorized as 1=liberal, 2=conservative, 3=independent, etc.

Demographic keywords may include information regarding age, gender, relationship status, home state, and school. Demographic keywords may be represented by numerical values, binary values, and/or categorical values. Keywords relating to interests include book titles, authors, movies, television programs, and music. In the illustrated embodiment, keywords relating to interests are represented by binary values. Examples of keywords relating to usage include information regarding friendships, blog posts, online gifts given and received via the social network provider 130, online purchases via the social network provider 130, photo uploads and downloads, photo tags, and photo tag confirmations, and may be represented by numerical values, binary values, and/or categorical values.

Table 1 illustrates various types of keywords that may be stored in the profile database 200. For example, the keyword "Birth Year" in the Keyword Names column of Table 1 is a Demographic keyword and may be represented by a numerical value. The keyword, "Political Views" is also a demographic keyword but may be represented by a categorical value (e.g., 1=liberal, 2=conservative, 3=independent, etc.). The entry "Top 5000 Favorite Movies" in the Keyword Names column represents 5000 different keywords each associated with a different one of 5000 of the most popular movie titles in the profile database, respectively. For example, the movie title "Gone With The Wind" may be a keyword. Each of the 5000 keywords is an Interest keyword and is represented by a binary value in the illustrated embodiment to indicate that the movie title occurs or does not occur in the profile of a user 102. While Demographic and Interest keyword types are illustrated in Table 1, other keyword types (e.g., contacts, skills, etc.) may also be included.

TABLE 1

| Keywords | | |
|---|---|---|
| Keyword Names | Keyword Type | Value |
| Gender | Demographic | Categorical |
| Birth Year | Demographic | Numerical |
| Political Views | Demographic | Categorical |
| Relationship Status | Demographic | Categorical |
| User Type | Demographic | Categorical |
| Top 5000 Favorite Movies | Interests | 5000 Binary |
| Top 5000 Favorite Books | Interests | 5000 Binary |
| Top 5000 Favorite Music | Interests | 5000 Binary |
| Top 5000 Favorite Activities | Interests | 5000 Binary |
| Top 5000 Favorite TV shows | Interests | 5000 Binary |

The group selection module 210 is configured to select a first group of users 102A and a second group of users 102B. The group selection module 210 may use various criteria for selecting users 102 for the first group and/or the second group. For example, an invitation may be sent to a number of users 102, and the group selection module 210 may select the users 102A from users 102 who respond positively to the invitation for the first group and the users 102B from users 102 who respond negatively to the invitation for the second group. Alternatively, the first or second group may include a random selection of all users 102.

In some embodiments, the group selection module 210 is configured to use a probability function to select the first group of users 102A and/or the second group of users 102B. The probability function may be used to calculate a probability that a user 102 will respond to an invitation. The group selection module 210 may select the users 102A from users 102 for whom the calculated probability of a positive response is greater than (or less than) a threshold. The second group may include a random selection of all users 102. Alternatively, the second group may be selected from users 102 for whom the calculated probability of a positive response is less than (or greater than) the threshold for inclusion in the first group, or another threshold. The threshold may be selected to provide a desired number of users 102A and/or 102B.

The methods of selecting two groups of users are not limited to using the various combinations of probability calculations, random selection, and/or user responses discussed above. Other methods of selecting pairs of groups may be used. For example, selection of pairs of groups may be based on activities initiated by the users 102, activities directed at the users 102 by others, inferred characteristics of the users 102, capabilities of the users 102, skill levels of the users 102, etc. More information about group selection and keyword selection is contained in a paper entitled "Personalization for Online Social Networks" by Yun-Fang Juan, et al., presently unpublished and attached hereto as an appendix.

The histogram module 220 is configured to calculate a first histogram for the first group and a second histogram for the second group. For each of the keywords, the histogram module 220 determines the number of profiles in which the keyword occurs in the first group and number of profiles in which the keyword occurs in the second group. The histogram module 220 may store the number as a percentage of the total number of profiles in the first group and the second group, respectively.

Table 2 includes "Keyword," "First Group," "Second Group," and "Score" columns. Table 2 is sorted according to values in the "Score" column, which is discussed below. The "First Group" column in Table 2 represents the first histogram and the "Second Group" column represents the second histogram. Each of the keywords in the "Keyword" column is associated with a percentage in the "First Group" column and another percentage in the "Second Group" column. For example, the keyword "red hot chili peppers" is associated 6 percent in the "First Group" column and 0.9 percent in the "Second Group" column. Thus, the keyword "red hot chili peppers" occurs in 6 percent of the profiles of the users 102A in the first group and in 0.9 percent of the profiles of the users 102B in the second group.

Values other than percentages may be represented in the first and second histograms, for example, frequency of occurrences, total number of occurrences, probability of occurrence, etc. To avoid storing useless information, the histogram module 220 may omit a keyword, for example, when the keyword occurs in substantially all of the profiles or none of the profiles. While Table 2 illustrates 20 keywords, fewer or more keywords may be included in the first and the second histograms. Some of the keywords illustrated in Table 2 are demographic type keywords. For example, "politics (liberal)," "age range (20-25)," and "age range (50-55)." In some embodiments, a numerical value may be used to calculate a histogram entry. For example, an age entry for the first and the second histograms may be based on an average age, maximum age, minimum age, mean age, etc. of the users 102A in the first group and users 102B in the second group, respectively.

TABLE 2

Keyword Histogram

| Keyword | First Group | Second Group | Score |
|---|---|---|---|
| 24 (tv show) | 15.0 | 0.2 | 14.8 |
| sportscenter | 12.0 | 1.0 | 11.0 |
| wedding crashers | 8.0 | 0.8 | 7.2 |
| age range (20-25) | 11.0 | 5.0 | 6.0 |
| friday night lights | 6.0 | 0.8 | 5.2 |
| red hot chili peppers | 6.0 | 0.9 | 5.1 |
| seinfeld | 6.0 | 2.0 | 4.0 |
| remember titans | 13.0 | 12.0 | 1.0 |
| baseball | 5.0 | 4.0 | 1.0 |
| girls | 2.0 | 1.0 | 1.0 |
| lost | 0.9 | 0.5 | 0.4 |
| family guy | 0.3 | 0.1 | 0.2 |
| south park | 0.3 | 0.1 | 0.2 |
| basketball | 0.6 | 0.4 | 0.2 |
| politics (liberal) | 0.1 | 0.0 | 0.1 |
| gladiator | 0.3 | 0.2 | 0.1 |
| foo fighters | 0.5 | 0.4 | 0.1 |
| happy gilmore | 0.1 | 0.1 | 0.0 |
| sports | 0.1 | 0.1 | 0.0 |
| age range (50-55) | 0.0 | 0.0 | 0.0 |

The score module 230 is configured to calculate a score for each keyword based on a function $F(A_j, B_j)$ where, $A_j$ is a value representing the $j^{th}$ keyword in the "First Group" column (first histogram) and $B_j$ is a value representing $j^{th}$ keyword in the "Second Group" column (second histogram). An example of the function $F(A_j, B_j)$ includes a difference between $A_j$ and $B_j$. The Score column in Table 2 illustrates values representing an arithmetic difference $(A_j-B_j)$ for each keyword. For example, the score for the keyword "red hot chili peppers" is 5.1, which is equal to 6 percent in the "First Group" column minus 0.9 percent in the "Second Group" column. In various embodiments, the score function $F(A_j, B_j)$ includes an arithmetic difference, a ratio difference, an information gain, an odds ratio, a relevancy score, and so forth, as illustrated in Table 3.

TABLE 3

Examples of Score Functions $F(A_j, B_j)$

| Score Function Type | Function $F(A_j, B_j)$ |
|---|---|
| Arithmetic Difference | $(A_j - B_j)$ |
| Ratio Difference | $(A_j / B_j)$ |
| Information Gain | $H(A_j) - H(B_j)$<br>$H(p)$ denotes entropy of p where:<br>$$H(p) = p\log_2\left(\frac{1}{p}\right) + (1-p)\log_2\left(\frac{1}{1-p}\right)$$<br>and $p = \left(\frac{\text{positive examples}}{\text{total number of examples}}\right)$ |
| Odds Ratio | $(A_j(1 - B_j)) / ((1 - A_j)B_j)$ |
| Relevancy Score | $((A_j + D) / (B_j + D))$<br>D is the Laplace succession parameter |

The ranking module 240 is configured to arrange the histogram according to the scores of each keyword. The histogram may be ranked from highest score to lowest score, as illustrated in Table 2. For example, the keyword "red hot chili peppers" is ranked fifth in the histogram illustrated in Table 2. Alternatively, the histogram may be ranked from lowest score to highest score The keyword selection module 250 may select a predetermined number of keywords form the ranked histogram. For example, keywords having the highest six scores (i.e., "24," "sportscenter," "wedding crashers," "old," "friday night lights," and "red hot chili peppers") may be selected from the histogram in Table 2. Alternatively, the keyword selection module 250 may select keywords having a score greater than a threshold value, before or after the ranking module 240 arranges the histogram according to score. For example, the three keywords "24," "sportscenter," and "wedding crashers" may be selected based on having a score greater than 7.0. In various embodiments, the keyword selection module 250 may select keywords based on other criteria, for example, a predetermined number of the keywords having the lowest scores, keywords having scores lower than a threshold value, and so on.

Although the keyword extraction engine 140 is described as being comprised of various components (i.e., the profile database 200, the group selection module 210, the histogram module 220, the score module 230, the ranking module 240, and the keyword selection module 250), fewer or more components may comprise the keyword extraction engine 140 and still fall within the scope of various embodiments.

Figure 3:
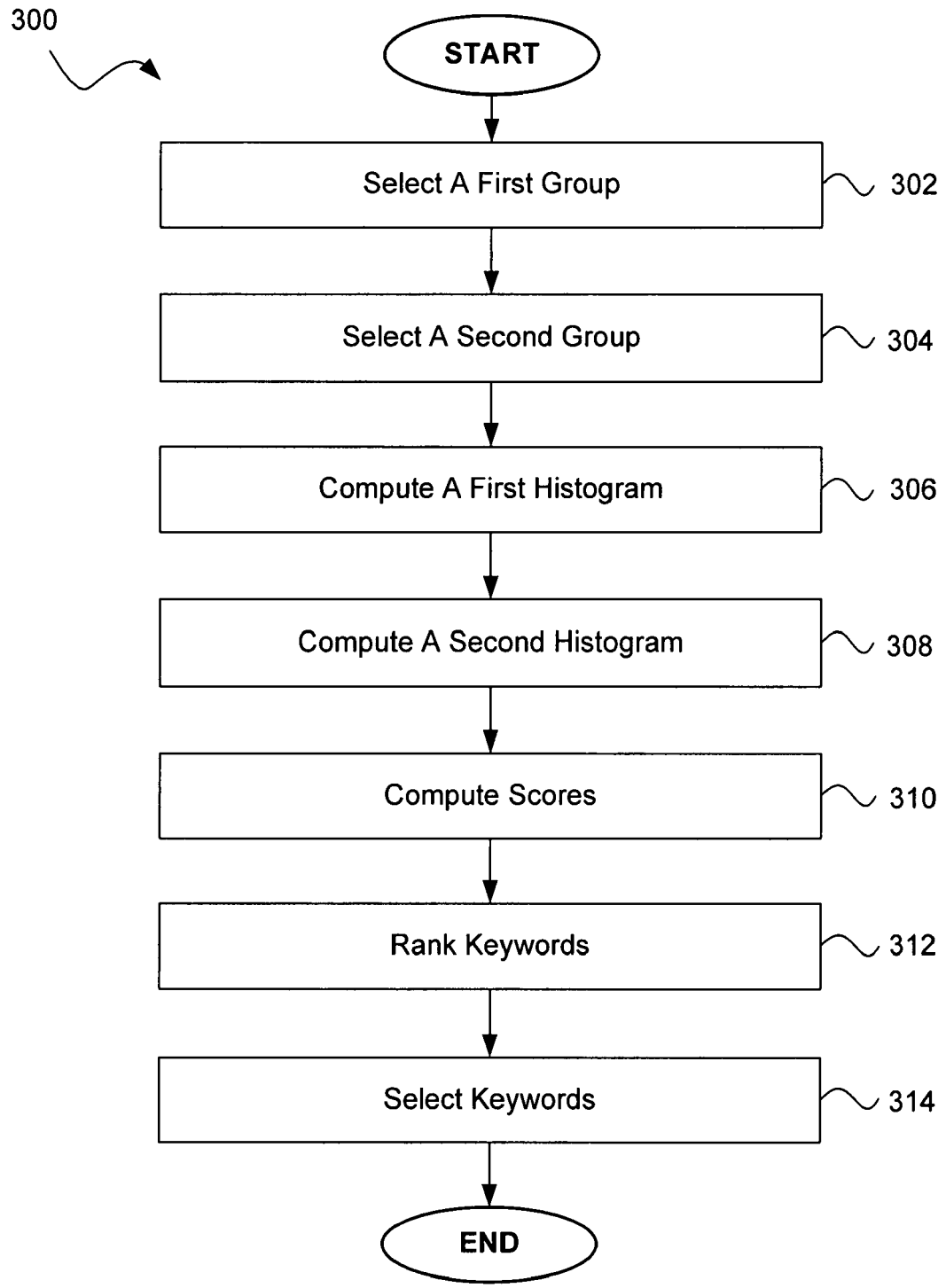
FIG. 3 is a flow chart of an exemplary method for selecting target users of a web-based social network environment.

FIG. 3 is a flow chart of an exemplary method 300 for selecting a subset of keywords from a set of master keywords in a social network environment 100. In step 302, a first group of user profiles is selected and in step 304, a second group of user profiles is selected. In step 306, a first histogram is computed for each keyword in the master keywords based on a number of occurrences of the keyword in the first group of user profiles. In step 308, a second histogram is computed for each keyword in the master keywords based on a number of occurrences of the keyword in the second group of user profiles. The histograms computed in steps 306 and 308 may include the percentage or the number of occurrences of each of the keywords in the first and second groups, respectively. In step 310, a score is computed based on a comparison of the first histogram and the second histogram for each keyword in the master keywords. In optional step 312, the master keywords are ranked based on the scores, for example, by sorting the scores from highest to lowest. In step 314, a subset of keywords is selected based on the score for each of the master keywords. As above, the one hundred highest scored keywords may be selected from the master keywords based on the ranking. Alternatively, the keywords having a score greater than a predetermined number may be selected.

While the method 300 is described as being comprised of various steps, fewer or more steps may comprise the process and still fall within the scope of various embodiments. The order of the steps in the method 300 may be varied and still fall within the scope the various embodiments. For example, the step 306 of computing a first histogram may be performed after the step 308 of computing the second histogram. In some embodiments, the steps of method 300 may be performed by the keyword extraction engine.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for selecting a subset of keywords from a set of master keywords in user profiles of social network users, comprising:
    sending invitations to a first group of users of a social networking system and to a second group of users of a social networking system;
    observing responses to the invitations from the first and second groups of users;
    computing a first histogram of each keyword in the master keywords based on the occurrence of the keywords in a first group of user profiles, the first group of user profiles associated with the first group of users;
    computing a second histogram of each keyword in the master keywords based on the occurrence of the keywords in a second group of user profiles, the second group of user profiles associated with the second group of users;
    computing, by a computing system, a score based on a comparison of the first histogram and the second histogram for each keyword in the master keywords, wherein computing the score for each keyword comprises computing a difference between an information gain for an entry in the first histogram corresponding to the keyword and an information gain for an entry in the second histogram corresponding to each keyword;
    ranking the master keywords based on the score of the keywords; and
    selecting a subset of keywords from the master keywords based on the ranking.

2. The method of claim 1, wherein the master keywords include all the keywords occurring in the user profiles of all the social network users.

3. The method of claim 1, wherein the first group of users responded positively to the invitations.

4. The method of claim 3, wherein the second group of users responded negatively to the invitations.

5. The method of claim 3, wherein the second group of user profiles includes profiles selected randomly from all social network users.

6. The method of claim 1, wherein the first group of user profiles includes profiles of users selected from the social network users based on a calculated probability that each social network user will respond to an invitation.

7. The method of claim 6, wherein the calculated probability of each user responding to the invitation is determined using a probability function having as input keywords in the profile of the user.

8. The method of claim 6, wherein the second group of user profiles includes profiles of users selected randomly from the social network users.

9. The method of claim 6, wherein the second group of user profiles includes profiles of users selected from the social network users based on a calculated probability that each social network user will respond to the invitation.

10. The method of claim 1, wherein computing a score for each keyword comprises computing a difference between an entry in the first histogram corresponding to the keyword and an entry in the second histogram corresponding to each keyword.

11. The method of claim 1, wherein computing a score for each keyword comprises computing a ratio between an entry in the first histogram corresponding to the keyword and an entry in the second histogram corresponding to each keyword.

12. A method for selecting a subset of keywords from a set of master keywords found in user profiles of social network users, comprising:
   sending invitations to a first group of users of a social networking system and to a second group of users of a social networking system;
   observing responses to the invitations from the first and second groups of users;
   computing the number of occurrences of each of the master keywords in a first group of user profiles, the first group of user profiles associated with the first group of users;
   computing the number of occurrences of each of the master keywords in a second group of user profiles, the second group of user profiles associated with the second group of users;
   determining for each keyword of the master keywords a first percentage of the profiles of first group of users including at least one occurrence of the keyword and a second percentage of the profiles of second group of users including at least one occurrence of the keyword;
   computing, by a computing system, a value for each of the master keywords based on a comparison of the number of occurrences in the first group of user profiles and the number of occurrences in the second group of user profiles, wherein computing the value for each of the master keywords comprises computing a difference between an information gain for the first percentage and an information gain for the second percentage;
   ranking the master keywords based on the computed value; and
   selecting a subset of keywords from the master keywords based on the ranking.

13. The method of claim 12, wherein the master keywords include all the keywords occurring in the profiles of all the social network users.

14. The method of claim 12, wherein the first group of users responded positively to the invitations.

15. The method of claim 14, wherein the second group of users responded negatively to the invitations.

16. The method of claim 14, wherein the second group of user profiles includes profiles of users selected randomly from the social network users.

17. The method of claim 12, wherein the first group of user profiles is selected from profiles of social network users based on a calculated probability that each social network user will respond to an invitation.

18. The method of claim 17, wherein the calculated probability of each user responding to the invitation is determined using a probability function having as input keywords in the profile of the user.

19. The method of claim 17, wherein the second group of user profiles includes profiles of users selected randomly from the social network users.

20. The method of claim 17, wherein the second group of user profiles includes profiles of users selected from the social network users based on a calculated probability that each social network user will respond to the invitation.

21. The method of claim 12, wherein computing a value for each of the master keywords comprises computing a difference between the first percentage and the second percentage.

22. The method of claim 12, wherein computing a value for each of the master keywords comprises computing a ratio of the first percentage divided by the second percentage.

23. The method of claim 12, wherein computing a value for each of the master keywords comprises computing an odds ratio of the first percentage and the second percentage.

24. The method of claim 12, wherein computing a value for each of the master keywords comprises computing a relevancy score for the first percentage and the second percentage.

25. A method for selecting a subset of keywords from a set of master keywords in user profiles of social network users, comprising:
   sending invitations to a first group of users of a social networking system and to a second group of users of a social networking system;
   observing responses to the invitations from the first and second groups of users;
   computing a first histogram of the master keywords based on the number of occurrence of each keyword in a first group of user profiles, the first group of user profiles associated with the first group of users;
   computing a second histogram of the master keywords based on the number of occurrence of each keyword in a second group of user profiles, the second group of user profiles associated with the second group of users;
   computing, by a computing system, a score based on a comparison of the first histogram and the second histogram for each keyword in the master keywords, wherein computing the score comprises computing a difference between an information gain for an entry in the first histogram corresponding to the master keyword and an information gain for an entry in the second histogram corresponding to each master keyword; and
   selecting the subset of keywords from the master keywords based on a comparison of the score for each keyword in the master keywords with a threshold value.

* * * * *